(12) United States Patent
Tanaka

(10) Patent No.: US 9,394,961 B2
(45) Date of Patent: Jul. 19, 2016

(54) DAMPING VALVE

(75) Inventor: Kazuhiro Tanaka, Minokamo (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/006,460

(22) PCT Filed: Feb. 29, 2012

(86) PCT No.: PCT/JP2012/055079
§ 371 (c)(1),
(2), (4) Date: Sep. 20, 2013

(87) PCT Pub. No.: WO2012/128007
PCT Pub. Date: Sep. 27, 2012

(65) Prior Publication Data
US 2014/0000997 A1    Jan. 2, 2014

(30) Foreign Application Priority Data

Mar. 22, 2011  (JP) .................................. 2011-62318
Mar. 22, 2011  (JP) .................................. 2011-62319

(51) Int. Cl.
| | | |
|---|---|---|
| F16F 9/34 | (2006.01) | |
| F16F 9/18 | (2006.01) | |
| F16F 9/46 | (2006.01) | |
| F16F 9/512 | (2006.01) | |

(52) U.S. Cl.
CPC . *F16F 9/34* (2013.01); *F16F 9/182* (2013.01); *F16F 9/3405* (2013.01); *F16F 9/464* (2013.01); *F16F 9/5126* (2013.01)

(58) Field of Classification Search
CPC ............... F16F 9/44; F16F 9/50; F16F 9/504; F16F 9/516; F16F 9/5165
USPC ........ 188/280, 314, 282.8, 282.6, 312, 319.2, 188/278, 266.3, 266.8, 266.5, 282.2, 322.15
IPC .......................................................... F16F 9/34
See application file for complete search history.

(56) References Cited

U.S. PATENT DOCUMENTS

| | | | | |
|---|---|---|---|---|
| 4,453,638 A | * | 6/1984 | Wallace ................... | F16F 9/446 188/282.9 |
| 4,535,877 A | | 8/1985 | Shimokura | |
| 4,660,689 A | * | 4/1987 | Hayashi ................... | F16F 9/468 188/282.3 |

(Continued)

FOREIGN PATENT DOCUMENTS

| | | |
|---|---|---|
| JP | S58-167346 U | 11/1983 |
| JP | S59-11933 U | 1/1984 |
| JP | H01-78746 U | 5/1989 |

(Continued)

*Primary Examiner* — Robert A Siconolfi
*Assistant Examiner* — San Aung
(74) *Attorney, Agent, or Firm* — Rabin & Berdo, P.C.

(57) ABSTRACT

A damping valve includes a piston, a damping passage, a piston rod, a bypass, and a relief valve, and the bypass includes a valve hole extending in the axial direction of the piston rod and a horizontal hole opening from a side part of the piston rod and leading to the valve hole, and the relief valve includes an annular valve seat provided on the side of a pressure side chamber with respect to an opening of the horizontal hole, a valve body slidably inserted on the side of an extension side chamber with respect to the annular valve seat and partitioning a back pressure chamber in the valve hole, a bias spring biasing the valve body toward the annular valve seat, and a throttle communicating the back pressure chamber with the extension side chamber.

7 Claims, 7 Drawing Sheets

(56) References Cited

U.S. PATENT DOCUMENTS

2006/0225976 A1* 10/2006 Nakadate .............. F16F 9/3484
                                                      188/266
2011/0203889 A1*  8/2011 Eom ........................ F16F 9/44
                                                      188/322.15

FOREIGN PATENT DOCUMENTS

| JP | H09-177862 A |   | 7/1997  |
|----|--------------|---|---------|
| JP | H09-291961 A |   | 11/1997 |
| JP | 2000-170820 A |  | 6/2000  |
| JP | 2006283923 A | * | 10/2006 |

* cited by examiner

DAMPING VALVE

TECHNICAL FIELD

The present invention relates to a damping valve.

BACKGROUND ART

As a conventional damping valve, for example, there is a known piston valve provided in a piston portion of a damper for a vehicle. The piston valve has an annular leaf valve laminated on an outlet end of a port which is provided in the piston portion, and the port is opened and closed by this leaf valve.

In the above piston valve, by fixing and supporting the inner circumferential side of the leaf valve and warping the outer circumferential side, the port is opened and closed by the leaf valve. When warping rigidity of the leaf valve is reduced, a damping force in a low speed region of piston speed is excessively decreased, and when the warping rigidity is increased, a damping force in a mid-high speed region of the piston speed is excessively increased. Thus, ride quality in the vehicle is not easily satisfied in all the speed regions.

Therefore, JP9-291961A discloses a valve structure in which the inner circumferential side of a leaf valve is not fixedly supported, the leaf valve is slidably installed to an outer circumference of a tubular piston nut attached to a leading end of a piston rod, and this leaf valve is biased by a coil spring.

In a damper to which this valve structure is applied, when piston speed at the time of an extension operation of a piston is in a low speed region, the leaf valve is not opened but a damping force is generated only by an orifice engraved on a valve seat. Thus, the damper exerts the same damping characteristic as a valve structure in which an inner circumference is fixedly supported.

On the other hand, when the piston speed of the damper reaches a mid-high speed region, a pressure of working oil passing through a port is applied to the leaf valve, and the leaf valve is warped and opened. Thereby, against a bias force of the coil spring, the leaf valve is lifted in the axial direction from the piston and retreated together with a main valve. Thus, in comparison to the valve structure in which the inner circumference is fixedly supported, a flow passage area is increased. Therefore, an excessive increase in the damping force with the piston speed of the mid-high speed region is prevented, so that the ride quality in the vehicle can be satisfied in all the speed regions at the time of the extension operation.

SUMMARY OF INVENTION

The damping valve disclosed in JP9-291961A can decrease the damping force with the piston speed of the mid-high speed region at the time of the extension operation of the damper but cannot decrease at the time of a contraction operation of the damper. In particular, upon an input of a shocking vibration of thrusting a wheel up for example when the vehicle goes over an uneven part on a road surface at the time of traveling, a damping force decrease effect cannot be sufficiently exerted.

When such vibration is inputted to the wheel, thrust vibration cannot be sufficiently eased but the thrust vibration is transmitted to a vehicle body. Thus, a shock called an impact shock is applied to the vehicle body. Therefore, the ride quality in the vehicle cannot be sufficiently improved.

An object of this invention is to provide a damping valve capable of exerting a damping force decrease effect at the time of a contraction operation of a damper and improving the ride quality of a vehicle.

According to one aspect of the present invention, a damping valve comprises a piston movably inserted into a cylinder and partitioning an interior of the cylinder into an extension side chamber and a pressure side chamber; a damping passage provided in the piston and communicating between the extension side chamber and the pressure side chamber; a piston rod movably inserted into the cylinder, the piston rod having one end coupled to the piston; a bypass provided in the piston rod and communicating the pressure side chamber with the extension side chamber by bypassing the damping passage; and a relief valve releasing the bypass upon an action of a pressure of the pressure side chamber, wherein the bypass includes a valve hole opening from the one end of the piston rod facing the pressure side chamber and extending in the axial direction of the piston rod, and a horizontal hole opening from a side part of the piston rod facing the extension side chamber and leading to the valve hole, and the relief valve includes an annular valve seat provided in the middle of the valve hole on the side of the pressure side chamber with respect to an opening of the horizontal hole, a valve body slidably inserted into the valve hole on the side of the extension side chamber with respect to the annular valve seat and partitioning a back pressure chamber in the valve hole, a bias spring inserted into the back pressure chamber and biasing the valve body toward the annular valve seat, and a throttle provided in the piston rod and communicating the back pressure chamber with the extension side chamber.

Embodiments of the present invention and advantages thereof are described in detail below with reference to the accompanying drawings.

DESCRIPTION OF EMBODIMENTS

Hereinafter, embodiments of the present invention will be described with reference to the drawings. The same reference signs given through several figures denote the same parts or corresponding parts.

A first embodiment will be described.

Figure 1:
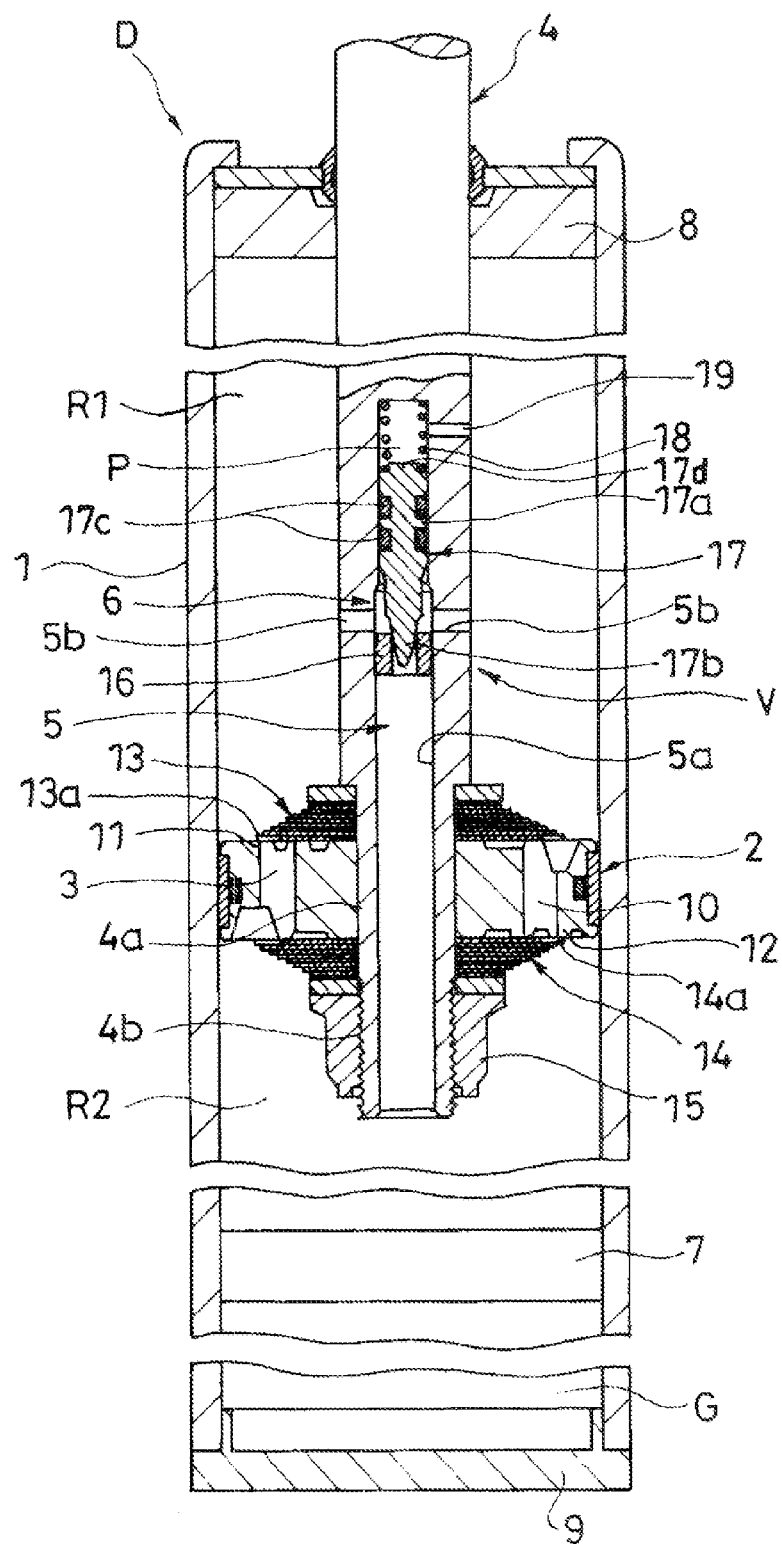
FIG. 1 is a vertically sectional view of a damper to which a damping valve according to a first embodiment of the present invention is applied.

As shown in FIG. 1, a damping valve V in the present embodiment is applied to a damper D. The damping valve V includes a piston 2 movably inserted into a cylinder 1 and partitioning an interior of the cylinder 1 into an extension side chamber R1 and a pressure side chamber R2, a damping passage 3 provided in the piston 2 and communicating between the extension side chamber R1 and the pressure side chamber R2, a piston rod 4 movably inserted into the cylinder 1 and of which one end (lower end in the FIG. 1) is coupled to the piston 2, a bypass 5 provided in the piston rod 4 and communicating the pressure side chamber R2 with the extension side chamber R1 by bypassing the damping passage 3, and a relief valve 6 releasing the bypass 5 upon an action of a pressure of the pressure side chamber R2.

The damper D includes the cylinder 1, the piston 2, the piston rod 4, and a free piston 7 slidably inserted into the cylinder 1 and partitioning a gas chamber G in the cylinder 1, a rod guide 8 closing an upper end (in FIG. 1) of the cylinder 1 and slidably and axially supporting the piston rod 4, and a bottom cap 9 closing a lower end (in FIG. 1) of the cylinder 1. A fluid such as working oil is charged into the extension side chamber R1 and the pressure side chamber R2 in the cylinder 1, and a gas is charged into the gas chamber G. As the fluid, water, a watery solution, and the like may be used in addition to the working oil. In a case where a liquid serves as the working oil, the gas to be charged into the gas chamber G is preferably an inert gas such as nitrogen which does not easily change properties of the liquid.

Since the damper D is a so-called single rod type, the volume of the piston rod 4 coming in and out of the cylinder 1 is changed in accordance with extension and contraction of the damper D. This volume change is compensated by expansion or contraction of the volume of the gas in the gas chamber G and movement of the free piston 7 in the up and down direction (in FIG. 1). Although the damper D is set in a single cylinder type in such a way, in place of installment of the free piston 7 and the gas chamber G, a reservoir may be provided on an outer circumference or an outer part of the cylinder 1 and the volume change of the piston rod 4 may be compensated by the reservoir. The damper D may be not the single rod type but a double rod type. In a case where the fluid to be charged into the extension side chamber R1 and the pressure side chamber R2 is a gas, the gas chamber G and the reservoir can be omitted.

In the piston rod 4, a small diameter portion 4a is formed on the lower end side (in FIG. 1), and a threaded portion 4b is formed on the leading end side of the small diameter portion 4a.

The piston 2 is formed in an annular shape, and the small diameter portion 4a of the piston rod 4 is inserted on the inner circumferential side of the piston 2. The damping passage 3 and an extension side passage 10 communicating between the extension side chamber R1 and the pressure side chamber R2 are provided in the piston 2. Further, the piston 2 includes a valve seat 11 surrounding an outer circumference of an upper end opening of the damping passage 3 in an upper end (in FIG. 1), and a valve seat 12 surrounding an outer circumference of a lower end opening of the extension side passage 10 in a lower end (in FIG. 1).

A leaf valve 13 to be separated from and seated on the valve seat 11 to open and close the upper end opening (in FIG. 1) of the damping passage 3 is laminated on the upper end (in FIG. 1) of the piston 2, and a leaf valve 14 to be separated from and seated on the valve seat 12 to open and close the lower end opening (in FIG. 1) of the extension side passage 10 is laminated on the lower end (in FIG. 1) of the piston 2.

Both the leaf valves 13, 14 are formed in an annular shape, and laminated on the piston 2 by inserting the small diameter portion 4a of the piston rod 4 on the inner circumferential side. The leaf valves 13, 14 are fixed to the piston rod 4 together with the piston 2 by a piston nut 15 screwed onto the threaded portion 4b of the piston rod 4 in a state that warp on the outer circumferential side is allowed.

Both the leaf valves 13, 14 are a lamination leaf valve formed by laminating a plurality of annular plates, and cutouts 13a, 14a are provided on outer circumferences of the annular plates abutted with the valve seats 11, 12. In a state that the leaf valves 13, 14 are seated on the valve seats 11, 12, the cutouts 13a, 14a function as orifices. It should be noted that instead of providing the cutouts 13a, 14a in the annular plates, dents may be engraved on the valve seats 11, 12 and the dents may function as orifices.

The leaf valve 13 is warped and opened by a differential pressure between the pressure side chamber R2 and the extension side chamber R1 at the time of a contraction operation of the damper D, to open the damping passage 3 and apply resistance to a flow of the liquid moved from the pressure side chamber R2 to the extension side chamber R1. The leaf valve 13 closes the damping passage 3 at the time of an extension operation of the damper D. Therefore, the damping passage 3 is a one-way passage for allowing only the flow of the fluid from the pressure side chamber R2 to the extension side chamber R1 by the leaf valve 13.

In contrast to the leaf valve 13, the other leaf valve 14 opens the extension side passage 10 and applies resistance to the passing fluid at the time of the extension operation of the damper D, and closes the extension side passage 10 at the time of the contraction operation. That is, the leaf valve 14 is a damping force generation element for generating an extension side damping force at the time of the contraction operation of the damper D, and the extension side passage 10 is a one-way passage for allowing only a flow of the fluid from the extension side chamber R1 to the pressure side chamber R2 by the leaf valve 14. It should be noted that as the valve for applying resistance to the fluid passing through the damping passage 3 and the extension side passage 10, in addition to the leaf valves 13, 14 described above, for example, a configuration that not an orifice but a choke and a leaf valve are arranged side by side can be adopted, and not a leaf valve but a poppet valve or other configurations can be adopted.

The bypass 5 includes a valve hole 5a opening from a lower end (in FIG. 1) which is one end of the piston rod 4 facing the pressure side chamber R2 and extending in the axial direction of the piston rod 4, and a horizontal hole 5b opening from a side part of the piston rod 4 facing the extension side chamber R1 and leading to the valve hole 5a.

The relief valve 6 includes an annular valve seat 16 provided in the middle of the valve hole 5a on the lower side (in FIG. 1) which is the side of the pressure side chamber with respect to an opening of the horizontal hole 5b, a valve body 17 slidably inserted into the valve hole 5a on the upper side (in FIG. 1) which is the side of the extension side chamber R1 with respect to the annular valve seat 16 and partitioning a back pressure chamber P in the valve hole 5a, a bias spring 18 inserted into the back pressure chamber P and biasing the valve body 17 toward the annular valve seat 16, and a throttle 19 provided in the piston rod 4 and communicating the back pressure chamber P with the extension side chamber R1.

The annular valve seat 16 is formed in an annular shape and press-fitted and fixed into the valve hole 5a. It should be noted that although the annular valve seat 16 is a separate part from the piston rod 4, an annular valve seat may be formed by providing a stepped portion on an inner circumference of the valve hole 5a of the piston rod 4. In this case, a through hole leading to the valve hole 5a from an upper end (in FIG. 1) of the piston rod 4 is provided, the valve body 17 and the bias spring 18 are inserted from the through hole side, and a spring seat supporting an upper end of the bias spring 18 is press-fitted and fixed into the valve hole 5a from the through hole side. At the time of fixing the annular valve seat 16, a method other than press-fitting may be performed.

The valve body 17 includes a trunk portion 17a in sliding contact with the inner circumference of the valve hole 5a, a conical valve head 17b provided in a lower end (in FIG. 1) of the trunk portion 17a, and two seal rings 17c installed on an outer circumference of the trunk portion 17a along the circumferential direction. The valve head 17b is formed in a conical shape and abutted with an inner circumferential edge of an upper end (in FIG. 1) of the annual valve seat 16 without any gap to block communication between the pressure side chamber R2 and the extension side chamber R1 via the bypass 5.

That is, in a seating state that the valve body 17 is abutted with the annular valve seat 16, the relief valve 6 becomes a closed state to block the bypass 5, and in a state that the valve body 17 is separated from the annular valve seat 16, the relief valve 6 becomes an opened state to release the bypass 5.

When the valve body 17 is moved from a closed valve position where the valve head 17b is abutted with the annular valve seat 16 to the upper side (in FIG. 1) and separated from the annular valve seat 16, the valve is opened and an annular gap is formed between the valve head 17b and the inner circumferential edge of the annular valve seat 16. Thereby, the pressure side chamber R2 and the extension side chamber R1 communicates each other. However, since the valve head 17b to be separated from and seated on the annular valve seat 16 is formed in a conical shape, the annular gap is gradually increased in accordance with an increase in an upward moving amount of the valve body 17. That is, a flow passage area can be gradually increased.

Further, by providing the two seal rings 17c in the valve body 17, a part between the valve body 17 and the piston rod 4 is sealed. Thus, communication between the front surface side which is the lower side (in FIG. 1) of the valve body 17 and the back pressure chamber P on the back surface side through an outer circumference of valve body 17 can be more reliably prevented. Thereby, at the time of moving the valve body 17 in the up and down direction (in FIG. 1) which is the axial direction in the valve hole 5a, an axis deviation of the valve body 17 is prevented, so that the valve head 17b can be abutted with the annular valve seat 16 without any deviation, and the relief valve can be reliably closed. Further, no variation is generated in the flow passage area at the time of opening the valve, so that a stable damping force can be exerted.

A small diameter convex portion 17d is provided in a back surface side end which is an upper end (in FIG. 1) of the trunk portion 17a, and the convex portion 17d is fitted to an inner circumference of the coil shape bias spring 18. The bias spring 18 is placed between a bottom (upper end in FIG. 1) of the valve hole 5a and the valve body 17 in a compressed state, to bias the valve body 17 toward the annular valve seat 16. Even in a state that the valve body 17 is seated on the annular valve seat 16, the bias spring 18 exerts a bias force and applies to an initial load to the valve body 17.

The throttle 19 applies resistance to the flow of the fluid flowing between the back pressure chamber P and the extension side chamber R1. At the time of retreat when the relief valve 6 is opened and the valve body 17 is moved in the direction of separating from the annular valve seat 16, the fluid is pushed out from the compressed back pressure chamber P to the extension side chamber R1. At this time, since the throttle 19 increases a pressure in the back pressure chamber P, retreat of the valve body 17 is suppressed by the pressure in the back pressure chamber P. Conversely, at the time of advancement when the valve body 17 is moved in the direction of coming close to the annular valve seat 16, the fluid is suctioned from the extension side chamber R1 into the enlarged back pressure chamber P. At this time, since the throttle 19 decreases the pressure in the back pressure chamber P, advancement of the valve body 17 is suppressed.

The relief valve 6 is formed as above, and when a force of pressing the valve body 17 in the direction of separating from the annular valve seat 16 upon an action of the pressure of the pressure side chamber R2 retreats the valve body 17 against the bias force of the bias spring 18 of biasing the valve body 17 to the side of the annular valve seat 16 and a force of pressing the valve body 17 to the side of the annular valve seat 16 by an internal pressure of the back pressure chamber P, the valve is opened to release the bypass 5. That is, the relief valve 6 is opened when the pressure of the pressure side chamber R2 reaches a predetermined open valve pressure to release the bypass 5. The open valve pressure can be adjusted by the initial load applied to the valve body 17 by the bias spring 18.

The back pressure chamber P suppresses movement of the valve body 17. Thus, even when the pressure of the pressure side chamber R2 is vibrationally changed, vibration of the valve body 17 can be suppressed. Therefore, a vibrational change of an opening degree of the relief valve 6 can be prevented, so that a damping force can be stably exerted.

Hereinafter, an operation of the damping valve V will be described.

The damping valve V exerts the damping force to the damper D at the time of the contraction operation of the damper D.

Figure 2:
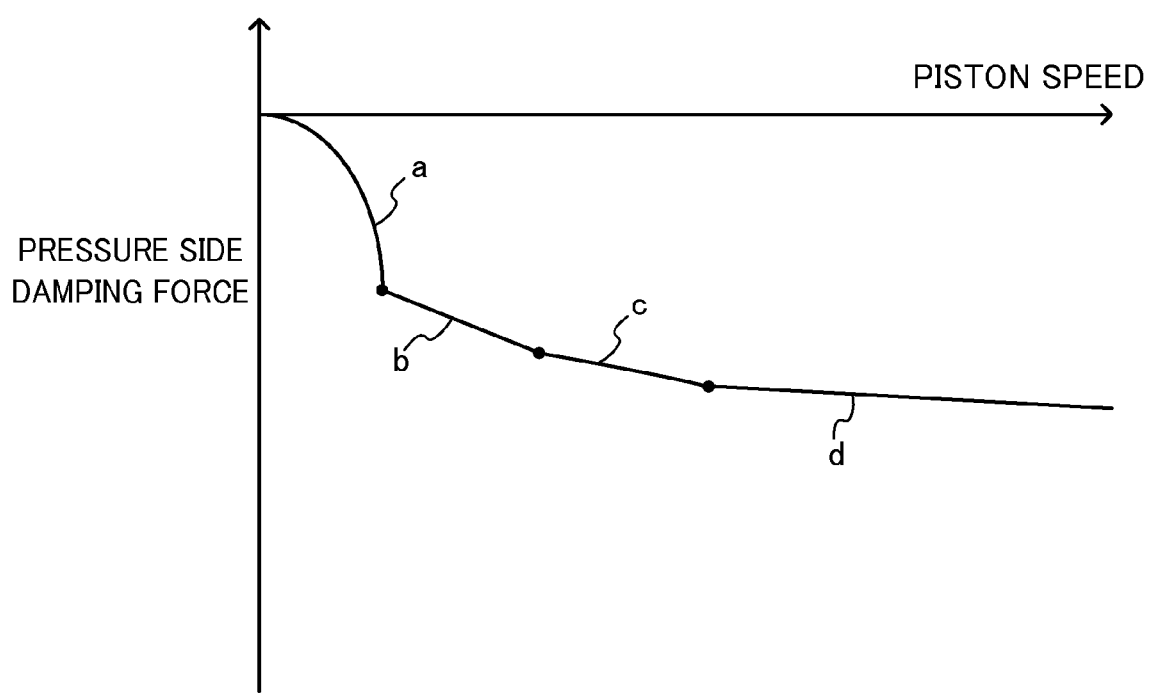
FIG. 2 is a graph showing a damping characteristic at the time of a contraction operation of the damper shown in FIG. 1.

At the time of the contraction operation of the damper D and in a case where the piston speed is in a low speed region, the pressure side chamber R2 is compressed and the extension side chamber R1 is enlarged by the piston 2. While the piston speed is low, neither the leaf valve 13 nor the relief valve 6 is opened. Thus, the fluid in the pressure side chamber R2 passes through only the cutout 13a functioning as an orifice provided on the outer circumference of the leaf valve 13 and is moved to the extension side chamber R1. Therefore, a damping characteristic (characteristic of the damping force with respect to the piston speed) of the damper D is, as shown in FIG. 2, a square-law characteristic which is typical of an orifice in which the damping force on the pressure side rises proportionally to a square of the piston speed with respect to the piston speed. In the low speed region, a damping coefficient becomes relatively large in comparison to a mid-high speed region (section a in FIG. 2). It should be noted that the damping coefficient is a gradient of the damping characteristic of FIG. 2.

When the piston speed is in a mid speed region, the fluid warps the outer circumference of the leaf valve 13, passes through a gap between the leaf valve 13 and the valve seat 11, and is moved to the extension side chamber R1 from the pressure side chamber R2. Therefore, the damping characteristic of the damper D is dominated by the characteristic by the leaf valve 13 (section b in FIG. 2) until an area of the gap between the leaf valve 13 and the valve seat 11 becomes equal to the flow passage area of the damping passage 3, and dominated by the characteristic by the damping passage 3 (section c in FIG. 2) when the area of the gap between the leaf valve 13 and the valve seat 11 becomes larger than the flow passage area of the damping passage 3.

That is, in the section b, since the area of the gap between the leaf valve 13 and the valve seat 11 is smaller than the flow passage area of the damping passage 3, the flow of the fluid is throttled in the gap between the leaf valve 13 and the valve seat 11 where the flow passage area is smaller. Therefore, regarding the damping characteristic of the damper D, the characteristic of throttling the flow of the fluid by the leaf valve 13, that is, the characteristic of generating the damping force which is proportional to a pressure increase of the pressure side chamber R2 becomes dominant.

On the other hand, in the section c, since the piston speed becomes high and the pressure in the pressure side chamber R2 becomes high, a warp amount of the leaf valve 13 is increased. Thereby, since the area of the gap between the leaf valve 13 and the valve seat 11 becomes larger than the flow passage area of the damping passage 3, the flow of the fluid is throttled by the damping passage 3 where the flow passage area is smaller. Therefore, regarding the damping characteristic of the damper D, the port characteristic of throttling the flow of the fluid by the damping passage 3 becomes dominant. It should be noted that the damping coefficient in the section b is larger than the damping coefficient in the section c because a restoring force of closing the damping passage 3 by the leaf valve 13 in accordance with the warp amount is applied in the section b.

When the piston speed is in a high speed region, the pressure of the pressure side chamber R2 exceeds the open valve pressure of the relief valve 6 and the relief valve 6 is opened. In this case, since not only the leaf valve 13 but also the relief valve 6 are opened and communication between the pressure side chamber R2 and the extension side chamber R1 is provided not only by the damping passage 3 but also by the bypass 5, the flow passage area is increased. Thereby, since the pressure of the pressure side chamber R2 also escapes to the extension side chamber R1 via the bypass 5 in addition to the damping passage 3, the pressure increase of the pressure side chamber R2 in accordance with an increase in the piston speed is suppressed. Therefore, the damping characteristic of the damper D is, as shown in FIG. 2, proportional to the increase in the piston speed but the damping coefficient is decreased from the low-mid speed region, and the gradient of the damping characteristic is reduced (section d).

As described above, the damper D to which the damping valve V of the present embodiment is applied can exert a sufficient damping force by the cutout 13a functioning as an orifice, the leaf valve 13, and the damping passage 3 at the time of the contraction operation and in a case where the piston speed is in the low-mid speed region. Meanwhile, in a case where the piston speed is in the high speed region, the pressure increase in the pressure side chamber R2 is suppressed and excessiveness of the pressure side damping force of the damper D is prevented.

Therefore, according to the damping valve V of the present embodiment, ride quality in a vehicle in all the speed regions can be satisfied. For example, in a case where the piston speed reaches the high speed region due to an input of a shocking vibration of thrusting a wheel up for example when the vehicle goes over a projection on a road surface during traveling, excessiveness of the pressure side damping force of the damper D is prevented. Thereby, transmission of the shocking vibration to a vehicle body is suppressed, so that an impact shock can be effectively reduced. Therefore, a damping force decrease effect can be sufficiently exerted at the time of the contraction operation of the damper D, so that the ride quality of the vehicle can be improved.

In the damping valve V of the present embodiment, the bypass 5 includes the valve hole 5a opening from the one end of the piston rod 4 and extending in the axial direction of the piston rod 4, and the horizontal hole 5b opening from the side part of the piston rod 4 and leading to the valve hole 5a, the relief valve 6 includes the annular valve seat 16 provided in the valve hole 5a, the valve body 17 slidably inserted into the valve hole 5a, the bias spring 18 inserted into the back pressure chamber P, and the throttle 19 provided in the piston rod 4 and communicating back pressure chamber P with the extension side chamber R1, and both the bypass 5 and the relief valve 6 are provided in the piston rod 4. Thus, these members do not affect a stroke length of the damper D. Therefore, since there is no need for shortening the stroke length of the damper D, mountability of the damper D onto the vehicle can be improved.

Although the valve body 17 of the relief valve 6 includes the conical valve head 17b, the present invention is not limited to this. For example, a slot may be provided in the valve head, the valve head may be inserted into the annular valve seat 16, and the bypass 5 may be released through the crack by retreat of the valve body from the annular valve seat 16. A valve by which the flow passage area can be maximized when the relief valve 6 is opened can also be adopted. However, by adopting a valve body by which the flow passage area is gradually increased in accordance with a separation distance of the valve body 17 from the annular valve seat 16, an extreme inflection point in the damping characteristic can be prevented, so that the ride quality in the vehicle can be more improved.

In the present embodiment, in order to describe a change in the damping characteristic, the piston speed is sectioned by low speed, mid speed, and high speed. However, border speed of these sections can be respectively arbitrarily set and the open valve pressure of the relief valve 6 may be set in accordance with this setting of the sections. That is, in a case where the sections of mid speed and high speed are shifted to higher piston speed, the open valve pressure of the relief valve 6 may be increased, and in a case where the sections are shifted to lower piston speed, the open valve pressure of the relief valve 6 may be lowered. Similarly, in a case where the sections of low speed and mid speed are shifted to higher piston speed, the open valve pressure of the leaf valve 13 may be increased, and in a case where the sections are shifted to lower piston speed, the open valve pressure of the leaf valve 13 may be lowered.

A second embodiment will be described.

In the damper D to which the damping valve V of the first embodiment is applied, in a case where the damping characteristic at the time of the contraction operation of the damper D is tuned to match with preference of a user, there is a need for taking the damping valve V out from the damper and replacing the bias spring 18.

Thus, in the present embodiment, a damping valve V capable of easily tuning the damping characteristic at the time of the contraction operation of the damper D will be described.

Figure 3:
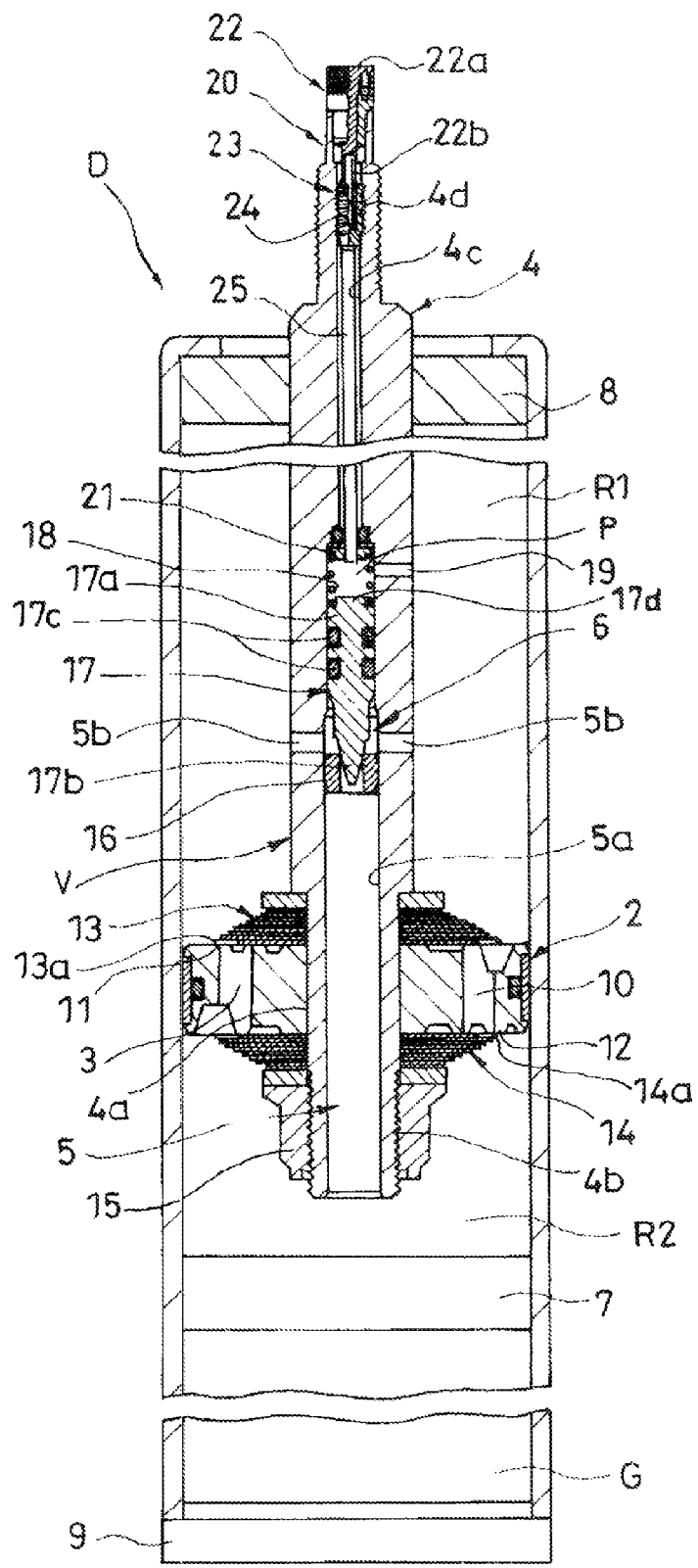
FIG. 3 is a vertically sectional view of the damper to which a damping valve according to a second embodiment of the present invention is applied.

As shown in FIG. 3, the damping valve V in the present embodiment is applied to the damper D. Since configurations of part of the damper D and the damping valve V are the same as the first embodiment, the description thereof will be omitted, and only different parts will be described.

In the present embodiment, the relief valve 6 further includes an adjustment mechanism 20 adjusting the bias force of the bias spring 18, and the bias spring 18 is placed between a spring receiver 21 in the adjustment mechanism 20 and the valve body 17 in a compressed state.

The adjustment mechanism 20 includes the spring receiver 21 supporting one end of the bias spring 18, an adjuster 22 rotatably attached to the other end of the piston rod 4, and a feed screw mechanism 23 bringing the spring receiver 21 forward and backward with respect to the piston rod 4 in the back pressure chamber P by rotation of the adjuster 22.

The adjuster 22 is rotatably installed in the upper end (in FIG. 3) which is the other end of the piston rod 4, and includes a dial 22a operable from the outer side of the piston rod 4, and a shaft 22b provided in a lower part (in FIG. 3) of the dial 22a and inserted into a hollow portion 4c leading to the valve hole 5a from the other end of the piston rod 4. The feed screw mechanism 23 includes a threaded portion 4d provided on an inner circumference of the hollow portion 4c of the piston rod 4, a bottomed tubular nut 24 whose outer circumference is screwed to the threaded portion 4d, and a connection rod 25 having a lower end (in FIG. 3) which is one end coupled to the spring receiver 21 and the other end abutted with a bottom part of the nut 24.

A sectional shape of an inner circumference of the nut 24 and a sectional shape of an outer circumference of the shaft 22b are not the perfect circle but the same shape. Therefore, when the shaft 22b of the adjuster 22 is fitted into the nut 24, the nut 24 and the adjuster 22 are incapable of being relatively rotated in the circumferential direction but relative movement in the axial direction is allowed.

When the dial 22a of the adjuster 22 is operated and rotated, the nut 24 is also rotated in the circumferential direction in the hollow portion 4c of the piston rod 4. Since the nut 24 is screwed to the threaded portion 4d, the nut 24 is moved in the up and down direction (in FIG. 3) in the piston rod 4.

The connection rod 25 receives the bias force of the bias spring 18 through the spring receiver 21, and is biased upward (in FIG. 3) and pressed to the bottom part of the nut 24.

The adjustment mechanism 20 is formed as above, and when the dial 22a of the adjuster 22 is operated and rotated, the nut 24 is moved in the up and down direction (in FIG. 3) with respect to the piston rod 4. Since the connection rod 25 is always pressed to the nut 24 by the bias spring 18, the connection rod 25 is also moved in the up and down direction by the movement in the up and down direction of the nut 24. Thereby, the spring receiver 21 coupled to the connection rod 25 is moved in the up and down direction (in FIG. 3) which is the axial direction with respect to the piston rod 4 in the back pressure chamber P in synchronization with the nut 24.

That is, the adjustment mechanism 20 can displace the spring receiver 21 in the up and down direction (in FIG. 3) with respect to the piston rod 4 in a manner of feed screw. A compression degree of the bias spring 18 can be changed by displacement of the spring receiver 21, and the initial load applied to the valve body 17 can be changed. By changing the initial load applied to the valve body 17 by the adjustment mechanism 20 in such a way, the open valve pressure of the valve body 17 can be adjusted.

It should be noted that the dial 22a of the adjuster 22 may be manually operated by the user or may be operated and rotated by an actuator. In a case where the dial is operated and rotated by the actuator, a control device for controlling the actuator in accordance with a vehicle body posture may be provided.

Since the damping valve V of the present embodiment includes the adjustment mechanism 20 adjusting the bias force of the bias spring 18 for biasing the valve body 17, by changing the initial load applied to the valve body 17 by the bias spring 18, the open valve pressure of the relief valve 6 can be changed. Thereby, the piston speed at which the relief valve 6 is opened can be changed. Specifically, the more the initial load applied to the valve body 17 by the bias spring 18 is increased, the more the open valve pressure of the relief valve 6 is increased and the piston speed at the time of opening the relief valve 6 is increased.

Figure 4:
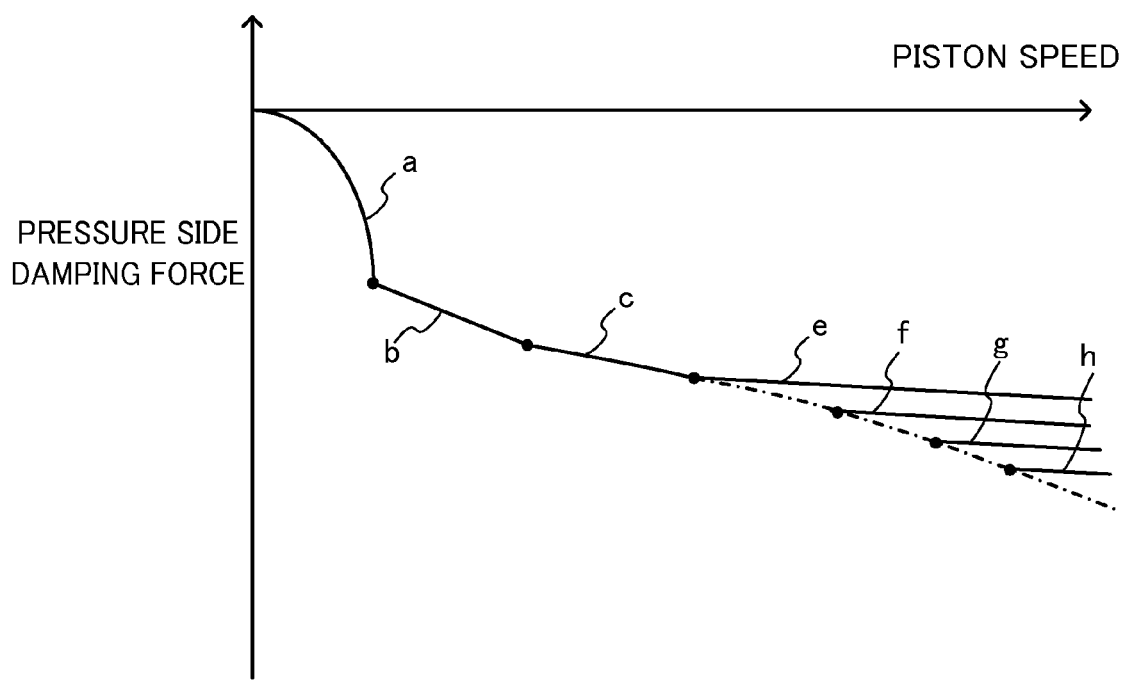
FIG. 4 is a graph showing a damping characteristic at the time of a contraction operation of the damper shown in FIG. 3.

Therefore, regarding the damping characteristic of the damper D, the more the initial load is increased, the higher the piston speed at the time of opening the relief valve 6 becomes as shown in FIG. 4. It should be noted that FIG. 4 shows the damping characteristic of the damper D in a case where the initial load is increased in order of e, f, g, and h.

With the damping valve V of the present embodiment, the initial load of the bias spring 18 can be easily adjusted from an exterior. Thus, the damping characteristic is readily tuned and the damping characteristic desired by the user can be easily realized.

Therefore, according to the damping valve V of the present embodiment, the damping force decrease effect can be exerted at the time of the contraction operation of the damper, so that the ride quality of the vehicle can be improved and the damping characteristic at the time of the contraction operation of the damper can be readily tuned.

A third embodiment will be described.

In the first embodiment, among the damping characteristic of the damper D after opening the relief valve 6, a retreat displacement amount of the valve body 17 from the annular valve seat 16 after opening the relief valve 6 is considered to be managed by controlling the pressure in the back pressure chamber P in addition to changing a spring constant of the bias spring 18. The pressure in the back pressure chamber P is controlled by a magnitude of resistance applied to the passing fluid by the throttle 19, specifically by the flow passage area of the throttle 19.

Therefore, in the damping valve V of the first embodiment, by setting the flow passage area of the throttle 19 to an area to realize a target damping characteristic in advance, the damping characteristic can be tuned.

It should be noted that when the damping characteristic is tuned only by the spring constant of the bias spring 18, not only the gradient of the damping coefficient after opening the relief valve 6 is changed but also the open valve pressure of the relief valve 6 is changed. Therefore, in order to return the open valve pressure to the original, there is a need for changing a natural length of the bias spring 18 or changing the total length of the valve body 17 or the back pressure chamber P so as to change the total length of a placement space of the bias spring 18. However, since such a change is complicated, the target damping characteristic is more easily realized by tuning the damping characteristic by providing the back pressure chamber P and the throttle 19.

By providing the throttle 19, the retreat of the valve body 17 can be suppressed by the pressure in the back pressure chamber P. Thus, a change in the gradient at the inflection point between the section c and the section d of the damping characteristic is smoothened, so that a radical change in the damping force can be eased.

Figure 5:
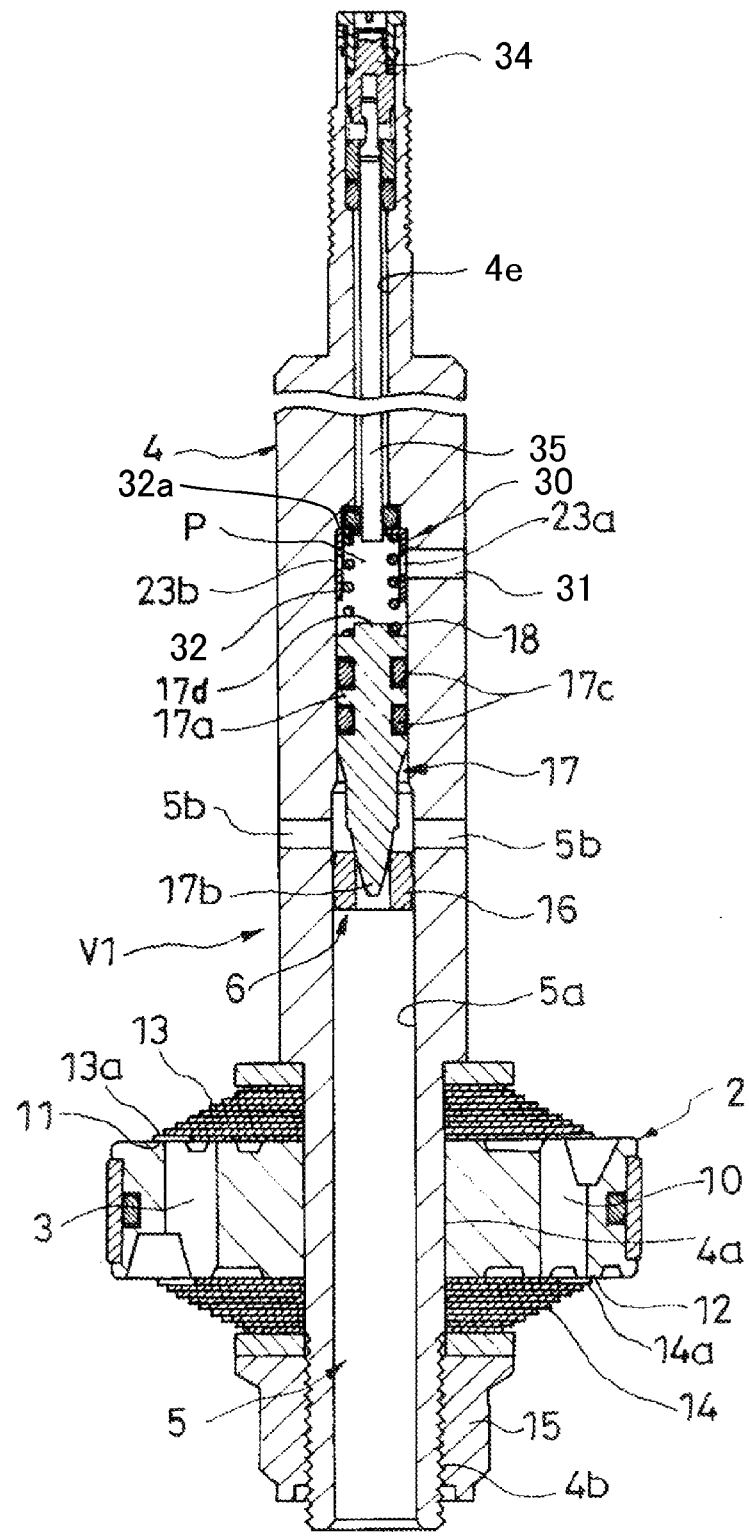
FIG. 5 is a vertically sectional view of a damping valve according to a third embodiment of the present invention.

Thus, in the present embodiment, a damping valve V1 capable of adjusting the damping characteristic after opening the relief valve 6 to a preferred characteristic by providing a variable throttle 30 in place of the throttle 19 of the damping valve V as shown in FIG. 5 will be described. It should be noted that since other configurations of the damper than the damping valve V1 are the same as the first embodiment in FIG. 5, parts other than the damping valve V1 are omitted in the figure.

The variable throttle 30 includes a transparent hole 31 opening from a side of the piston rod 4 facing the extension side chamber R1 and communicating with an interior of the back pressure chamber P, a tubular valve body 32 inserted into the back pressure chamber P rotatably in the circumferential direction and provided with throttle holes 23a, 23b being capable of facing the transparent hole 31, and a control rod 35 coupled to the tubular valve body 32 and inserted into the piston rod 4, the control rod being capable of being rotated by a rotation operation of an adjuster 34 provided in an upper end (in FIG. 5) which is the other end of the piston rod 4.

The tubular valve body 32 includes the two throttle holes 23a, 23b providing communication between an interior and an exterior of the tubular valve body 32 and having different opening areas, and an outer circumference is in sliding contact with the inner circumference of the valve hole 5a. The throttle holes 23a, 23b are provided on the same circumference of the tubular valve body 32, and the tubular valve body 32 can be rotated in the circumferential direction, so that any one of the throttle holes 23a, 23b can face the transparent hole 31. The tubular valve body 32 is formed in a topped tubular shape, and the bias spring 18 is placed between a top portion 32a and the valve body 17. Thereby, the tubular valve body 32 is pressed to a bottom part of the valve hole 5a and positioned in the axial direction in the back pressure chamber P. Thus, the tubular valve body 32 is not displaced in the axial direction and the throttle holes 23a, 23b are not incapable of facing the transparent hole 31.

The control rod 35 is rotatably inserted into a control rod insertion hole 4e opening from the bottom part of the valve hole 5a provided in the piston rod 4 and leading to the other end which is the upper end. One end of the control rod 35 is coupled to the tubular valve body 32 and the other end is coupled to the adjuster 34 attached to the upper end which is the other end of the piston rod 4 rotatably in the circumferential direction. Thereby, by the rotation operation of the adjuster 34, the tubular valve body 32 can be rotated in the circumferential direction in the back pressure chamber P via the control rod 35.

With the damping valve V1 of the present embodiment, by the rotation operation of the adjuster 34, the throttle hole 23a having a large opening area and the throttle hole 23b having a small opening area can selectively face the transparent hole 31. A pressure increase degree of the back pressure chamber P in a case where the valve body 17 is retreated from the annular valve seat 16 is smaller in a case where the throttle hole 23a having a large opening area faces the transparent hole.

Figure 6:
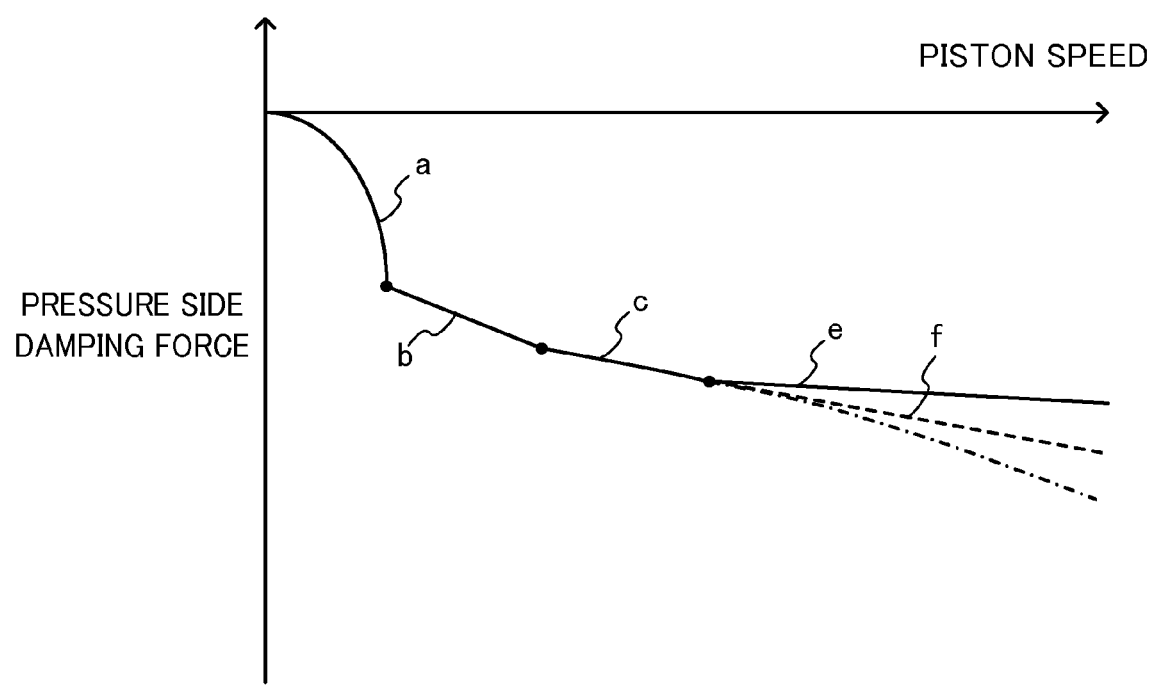
FIG. 6 is a graph showing a damping characteristic at the time of a contraction operation of a damper shown in FIG. 5.

Therefore, as shown in FIG. 6, after opening the relief valve 6, the damping characteristic e (solid line in the figure) of the damper D in a case where the throttle hole 23a faces the transparent hole 31 has a smaller damping coefficient than the damping characteristic f (broken line in the figure) of the damper D in a case where the throttle hole 23b faces the transparent hole 31. It should be noted that in a case where an outer circumferential surface of the tubular valve body 32 between the throttle hole 23a and the throttle hole 23b faces the transparent hole 31, the back pressure chamber P is isolated from the extension side chamber R1. Thus, the valve body 17 is brought into a locked state and not retreated, and the bypass 5 is maintained in a blocked state. In this case, the damping characteristic of the damper D has the largest damping force as shown by one-chain line in FIG. 6.

When the valve body 17 is retreated and displaced from the annular valve seat 16 to some extent, a lower end (in FIG. 5) of the tubular valve body 32 is abutted with the valve body 17 and further retreat and displacement of the valve body 17 are regulated. When the valve body 17 is retreated to be abutted with the tubular valve body 32, the valve body cannot be retreated further. Thus, in this case, a section in which the damping coefficient is increased (the gradient of the damping characteristic is increased) is formed on the high speed side of the section e or the section f of the damping characteristic.

As described above, by providing the variable throttle 30, the damping coefficient among the damping characteristic after opening the relief valve 6 can be easily adjusted, so that the damping characteristic to match preference of the user can be easily realized.

It should be noted that in the present embodiment, by providing the two throttle holes 23a, 23b in the tubular valve body 32, the damping characteristic of the damper D can be switched in three steps including a case where the transparent hole 31 is closed as shown in FIG. 6. However, the installment number of the throttle hole can be increased so as to switch in four or more steps.

Figure 7:
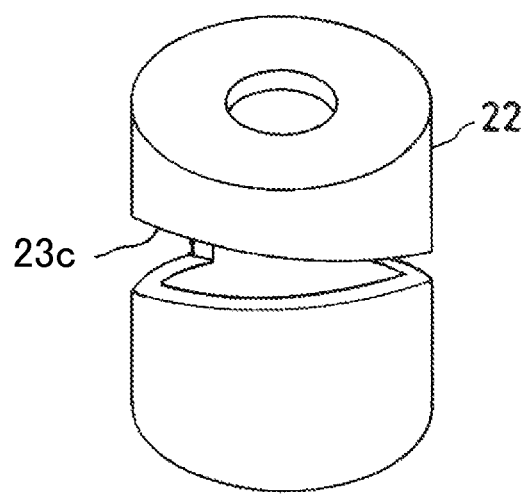
FIG. 7 is a perspective view of a tubular valve body.

For example, as shown in FIG. 7, a throttle hole 23c elongated in the circumferential direction in which an axial length is gradually changed along the circumferential direction may be provided in the tubular valve body 32, and an area where the transparent hole 31 and the throttle hole 23c are overlapped may be gradually changed in accordance with rotation of the tubular valve body 32. In place of this, the transparent hole provided in the piston rod 4 may be a long hole in which an axial length is gradually changed along the circumferential direction, the throttle hole provided in the tubular valve body 32 may face an arbitrary position of the long hole, and an area where the transparent hole and the throttle hole are overlapped may be changed. In any case, the damping characteristic of the damper D can be changed steplessly.

It should be noted that the adjuster 34 may be manually operated by the user or may be operated and rotated by an actuator. In a case where the adjuster is operated and rotated by the actuator, a control device for controlling the actuator in accordance with a vehicle body posture may be provided.

The embodiments of the present invention described above are merely illustration of some application examples of the present invention and not of the nature to limit the technical scope of the present invention to the specific constructions of the above embodiments.

The present application claims a priority based on Japanese Patent Application No. 2011-062318 and No. 2011-062319 filed with the Japan Patent Office on Mar. 22, 2011, all the contents of which are hereby incorporated by reference.

The invention claimed is:

1. A damping valve, comprising:
a cylinder;
a piston movably inserted into the cylinder and partitioning an interior of the cylinder into an extension side chamber and a pressure side chamber;
a damping passage provided in the piston to provide communication between the extension side chamber and the pressure side chamber;
a piston rod movably inserted into the cylinder, the piston rod having one end coupled to the piston, the one end facing the pressure side chamber;
a bypass provided in the piston rod to provide communication between the pressure side chamber and the extension side chamber by bypassing the damping passage, the bypass including
a valve hole opening from the one end of the piston rod facing the pressure side chamber so as to open on the pressure side chamber, the valve hole extending in an axial direction of the piston rod, and
a horizontal hole opening from a side part of the piston rod that faces the extension side chamber so as to open onto the extension side chamber, the horizontal hole leading to the valve hole; and
a relief valve releasing the bypass based upon a pressure of the pressure side chamber that is directly applied to the relief valve, the relief valve including an annular valve seat provided in a middle of the valve hole on a side of the pressure side chamber with respect to an opening of the horizontal hole, a valve body slidably inserted into the valve hole on a side of the extension side chamber with respect to the annular valve seat and partitioning a back pressure chamber in the valve hole, a bias spring inserted into the back pressure chamber and biasing the valve body toward the annular valve seat, and a throttle provided in the piston rod for providing direct communication between the back pressure chamber and the extension side chamber, the throttle always being unblocked to allow for communication from the back pressure chamber to the extension side chamber and from the extension side chamber to the back pressure chamber.

2. The damping valve according to claim 1, wherein the valve body includes two seal rings in sliding contact with an inner circumference of the valve hole are installed on an outer circumference of the valve body.

3. The damping valve according to claim 1, wherein the valve body includes a conical valve head to be separated from and seated on the annular valve seat.

4. The damping valve according to claim 1, wherein the relief valve includes an adjustment mechanism adjusting an initial load applied to the valve body of the bias spring.

5. The damping valve according to claim 4, wherein the adjustment mechanism includes a spring receiver supporting one end of the bias spring, an adjuster rotatably attached to the other end of the piston rod, and a feed screw mechanism bringing the spring receiver forward and backward with respect to the piston rod in the back pressure chamber by rotation of the adjuster.

6. The damping valve according to claim 1, wherein the throttle is capable of changing resistance applied to a flow of a passing fluid.

7. The damping valve according to claim 1, wherein the throttle includes a transparent hole opening from a side of the piston rod facing the extension side chamber and communicating with an interior of the back pressure chamber, a tubular valve body inserted into the back pressure chamber rotatably in a circumferential direction and provided with a throttle hole being capable of facing the transparent hole, and a control rod coupled to the tubular valve body and inserted into the piston rod, the control rod being capable of being operated and rotated from an outer side of an other end of the piston rod.

* * * * *